(12) United States Patent  
Huang et al.

(10) Patent No.: US 8,733,208 B2  
(45) Date of Patent: May 27, 2014

(54) SCREW AND NUT ASSEMBLY WITH SCREW ROD SUPPORT MEANS

(75) Inventors: Fu-Chun Huang, Taichung (TW); Chung-Shian Tsai, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 169 days.

(21) Appl. No.: 13/424,099

(22) Filed: Mar. 19, 2012

(65) Prior Publication Data

US 2013/0239854 A1 Sep. 19, 2013

(51) Int. Cl.
*F16H 1/20* (2006.01)
*F16H 1/24* (2006.01)

(52) U.S. Cl.
USPC .......................................... 74/664; 74/424.71

(58) Field of Classification Search
USPC .................. 74/664, 424.71, 424.72
See application file for complete search history.

(56) References Cited

U.S. PATENT DOCUMENTS 3,716,110 A * 2/1973 Fonda ........................... 180/405  
6,382,039 B1 * 5/2002 Choi ............................ 74/89.35  
8,276,475 B2 * 10/2012 Fujiwara et al. ........... 74/424.76

\* cited by examiner

*Primary Examiner* — Ha D Ho  
(74) *Attorney, Agent, or Firm* — Muncy, Geissler, Olds & Lowe, P.C.

(57) ABSTRACT

A screw and nut assembly includes a movable platform, a first screw and nut set with the first screw rod affixed between two locating members and the first screw nut pivotally mounted in the movable platform, a second screw and nut set with the second screw nut pivotally mounted in the movable platform, a driving mechanism for driving first screw nut and the second screw nut simultaneously for causing the first screw nut to create a first speed and the second screw nut to create a second speed slower than and reversed to the first speed, and a first support and a second support respectively affixed to the second screw rod to support and to move with the second screw rod. Thus, the gap between the movable platform and each support is changed subject to movement of the screw nuts.

10 Claims, 8 Drawing Sheets

SCREW AND NUT ASSEMBLY WITH SCREW ROD SUPPORT MEANS

BACKGROUND OF THE INVENTION

1. Field of the Invention

The present invention relates to screw and nut assemblies and more particularly, to a screw and nut assembly with screw rod support means.

2. Description of the Related Art

In a machine using a screw and nut set, the platform for carrying workpieces is affixed to the screw nut of the screw and nut set and movable with the screw nut forwardly and backwardly along the screw rod. To a screw and nut set that provides a relatively longer stroke, the screw rod has a relatively longer length. In this case, the screw rod has a greater tendency to deform during movement of the screw nut. During operation, the screw rod may be excessively deformed. As a result, the critical rotating speed of the screw rod will be constrained, and a high noise may be produced due to unsmooth movement between the screw rod and the screw nut. To avoid this problem, support means may be provided at the bottom side of the screw and nut set to support the screw rod, reducing the problems of screw rod deformation and constraint of critical rotating speed. FIG. 1 illustrates a prior art design with the arrangement of screw rod support means. According to this design, a connection rod 3 is connected between the screw nut 2 and each support 1, enabling each support 1 to be moved with the screw nut 2. Thus, the screw rod is well supported, minimizing deformation during operation. However, because the gap between each support 1 and the screw nut 2 is constant, the movable stroke of the screw nut 2 is relatively reduced due to the arrangement of the supports 1. FIG. 2 illustrates a pneumatic/hydraulic pressure-driven design according to the prior art. This design uses supports 4 to support the screw rod, and allows control of the positions of the supports 4 in supporting the screw rod to reduce the stroke in which the screw nut is stopped from movement. However, this pneumatic/hydraulic pressure-driven design is much expensive, limiting its applications.

SUMMARY OF THE INVENTION

The present invention has been accomplished under the circumstances in view. It is the main object of the present invention to provide a screw and nut assembly with screw rod support means, which enables the gap between the movable platform and each support to be changed subject to movement of the screw nuts, minimizing the stroke in which the platform is stopped from movement and, which is less expensive than conventional pneumatic or hydraulic pressure-driven designs.

To achieve this and other objects of the present invention, a screw and nut assembly comprises a movable platform, a first screw and nut set, which comprises a first screw rod fixedly connected between two locating members and a first screw nut pivotally mounted in the movable platform and threaded onto the first screw rod and movable along the first screw rod, a second screw and nut set, which comprises a second screw rod and a second screw nut pivotally mounted in the movable platform for receiving the second screw rod for allowing the second screw rod to be moved relative to the second screw nut, a driving mechanism adapted to drive the first screw nut and the second screw nut simultaneously for causing the first screw nut to create a first speed relative to the first screw rod and the second screw rod to create a second speed relative to the second screw nut, the first speed being reversed to and greater than the second speed, and a first support and a second support respectively affixed to the second screw rod to support the first screw rod and to move with the second screw rod.

Thus, during movement of said movable platform on said first screw rod, said second screw nut and said first screw nut are moved in the same direction, minimizing the stroke in which the first screw nut is stopped from movement. This structural design is less expensive when compared to conventional pneumatic or hydraulic pressure-driven designs.

DETAILED DESCRIPTION OF THE INVENTION

The advantages and features of the present invention will be fully understood by reference to the following examples in conjunction with the accompanying drawings.

Figure 1:
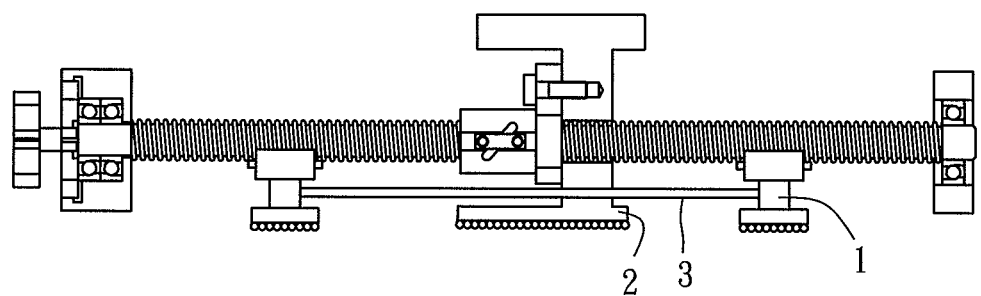
FIG. 1 is a schematic side view of a screw and nut assembly according to the prior art.
Figure 2:
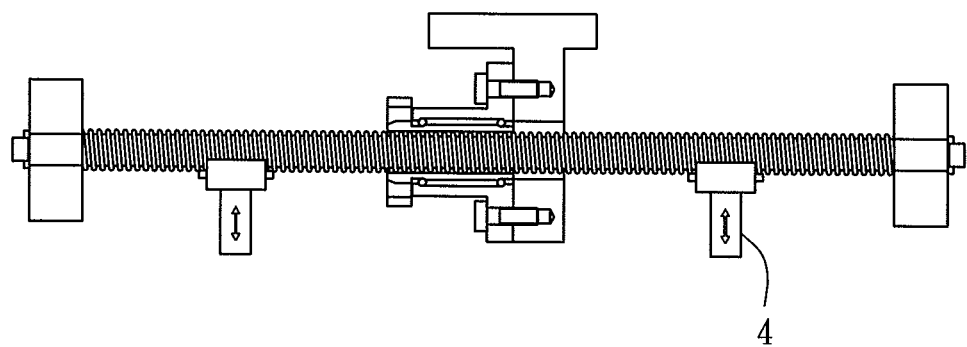
FIG. 2 is a schematic side view of another design of screw and nut assembly according to the prior art.
Figure 3:
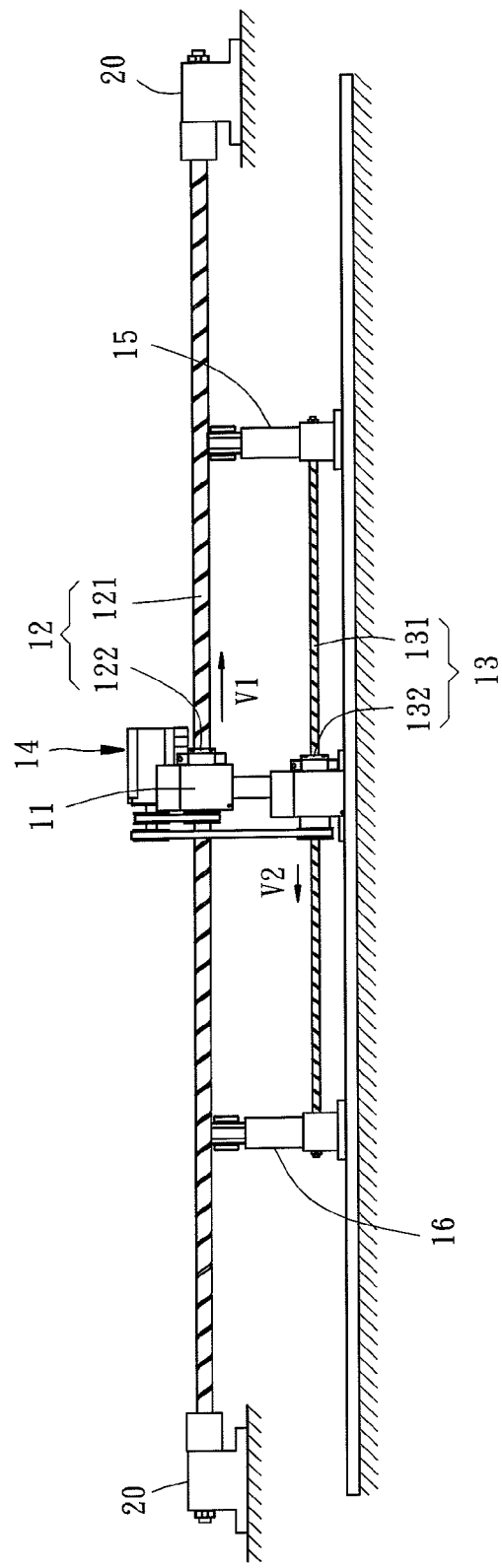
FIG. 3 is a front view of a screw and nut assembly in accordance with a first embodiment of the present invention.
Figure 4:
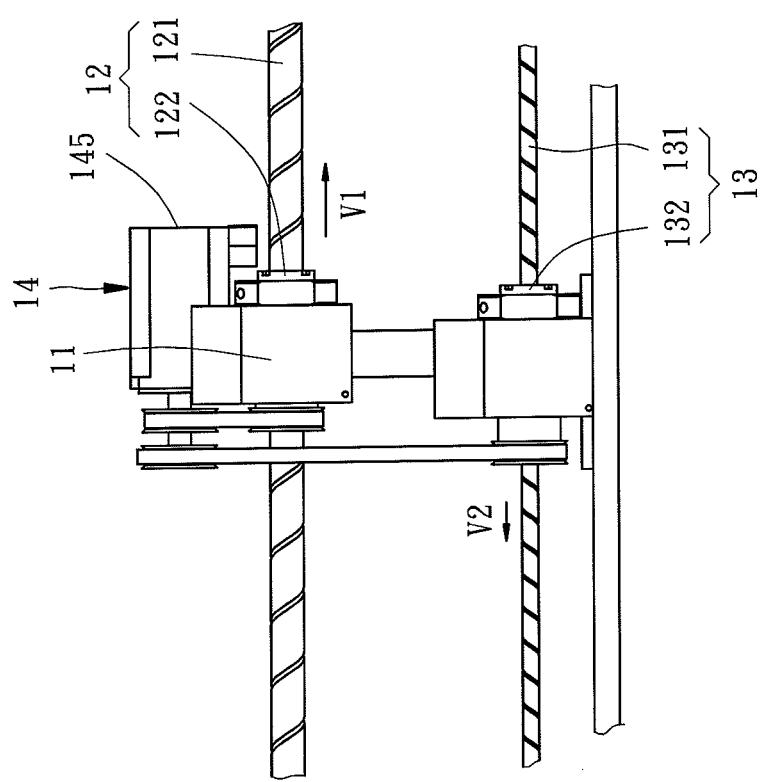
FIG. 4 is an enlarged view of a part of the screw and nut assembly in accordance with the first embodiment of the present invention.

Referring to FIGS. 3 and 4, a screw and nut assembly in accordance with a first embodiment of the present invention is shown. The screw and nut assembly comprises a movable platform 11, a first screw and nut set 12, a second screw and nut set 13, a driving mechanism 14, a first support 15 and a second support 16.

The movable platform 11 is adapted for carrying the cargo to be delivered, such as work pieces or any other goods.

The first screw and nut set 12 comprises a first screw rod 121 and a first screw nut 122. The first screw rod 121 has the two opposite ends thereof respectively affixed to a respective locating member 20, preventing rotation of the first screw rod 121. The first screw nut 122 is pivotally mounted in the movable platform 11 and threaded onto the first screw rod 121 for movement along the first screw rod 121. In this first embodiment, the locating members 20 hold the first screw rod 121 in position, enabling the first screw nut 122 to be moved smoothly along the first screw rod 121.

The second screw and nut set 13 comprises a second screw rod 131 and a second screw nut 132. The second screw nut 132 is pivotally mounted in the movable platform 11 in such a manner that the second screw rod 131 is threadable into the second screw nut 132 and movable relative to the second screw nut 132.

The driving mechanism 14 is adapted to drive the first screw nut 122 and the second screw nut 132 at the same time. During movement of the first screw nut 122, the first screw nut 122 creates a first speed V1 relative to the first screw rod 121. During movement of the second screw rod 131, the second screw rod 131 creates a second speed V1 relative to the second screw nut 132. The first speed V1 is greater than the second speed V2. Further, the direction of the first speed V1 is reversed to the direction of the second speed V2.

The first support 15 and the second support 16 are respectively affixed to the second screw rod 131 to support the first screw rod 121 and movable with the second screw rod 131. It is to be understood that the first support 15 and the second support 16 in this first embodiment both support the first screw rod 121 and are prohibited from rotation by the first screw rod 121, and therefore the first support 15 and the second support 16 can prohibit the second screw rod 131 from rotation, enabling the second screw nut 132 to move the second screw rod 131 positively. Further, it is to be noted here that a linear motion device, such as linear guide or pulley, can be provided at the bottom side of the first support 15 or second support 16, enhancing smooth functioning of the first support 15 or second support 16.

Figure 5:
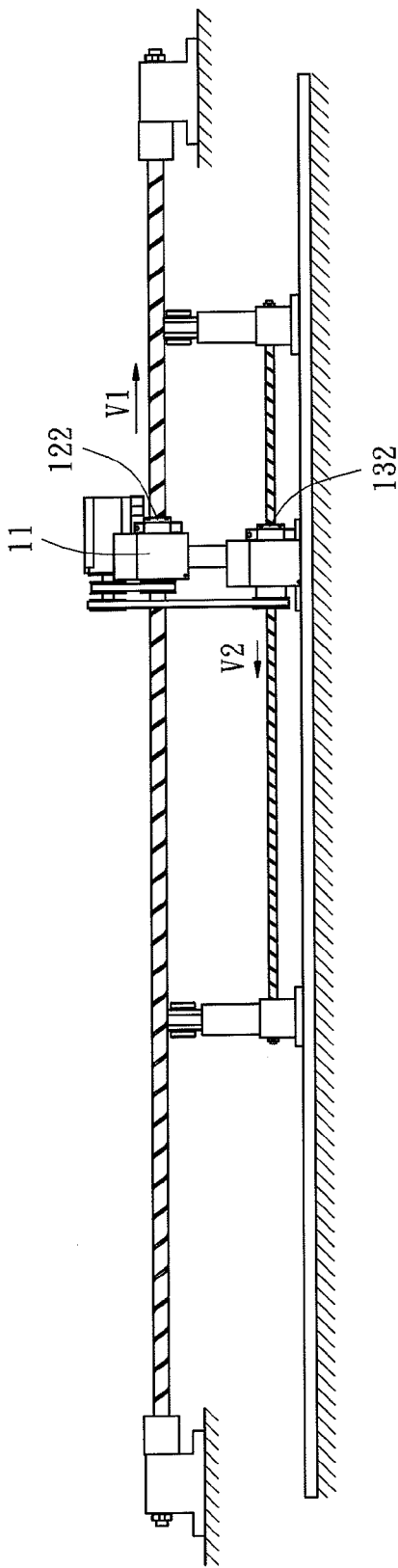
FIG. 5 is a schematic drawing illustrating an operation status of the screw and nut assembly in accordance with the first embodiment of the present invention (I).
Figure 6:
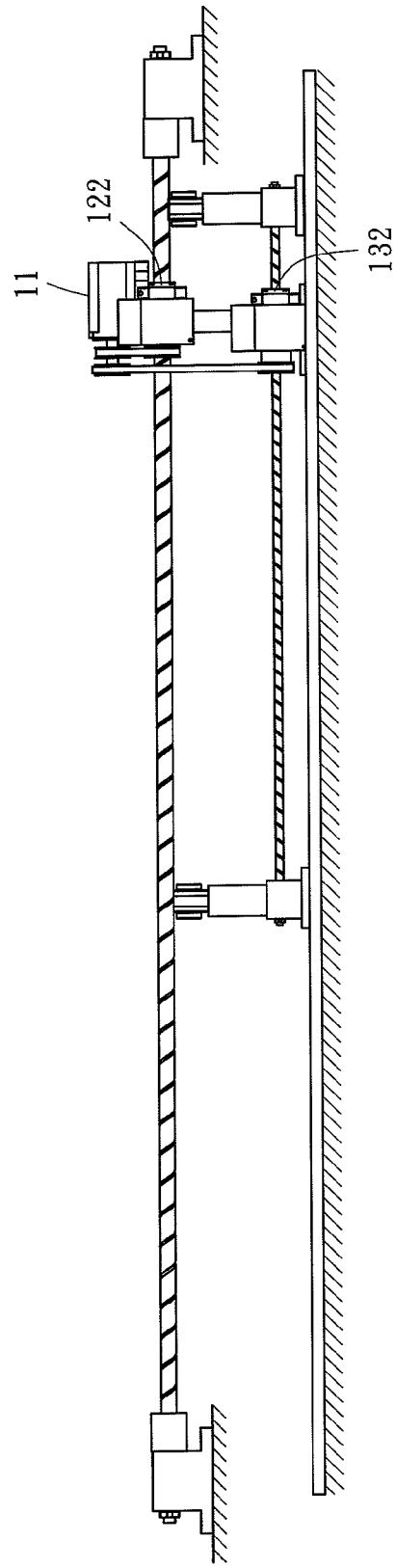
FIG. 6 is a schematic drawing illustrating an operation status of the screw and nut assembly in accordance with the first embodiment of the present invention (II).

After understanding of the structural details of the screw and nut assembly in accordance with the first embodiment, the operation of the screw and nut assembly will be outlined hereinafter. Please refer to FIGS. 5 and 6. In this application example, the movable platform 11 is movable toward the right side. The driving mechanism 14 drives the first screw nut 122 and the second screw nut 132 simultaneously, causing the movable platform 11 to be moved with the first screw nut 122 toward the right end of the first screw rod 121. At this time, the second screw rod 131 is being moved toward the left end of the second screw nut 132 to shorten the distance between the second screw nut 132 and the first support 15, thereby reducing the stroke to compensate the problem that the movable platform 11 is stopped from movement by the first support 15. Similarly, for moving the movable platform 11 toward the left side, the driving mechanism 14 rotates the first screw nut 122 and the second screw nut 132 simultaneously, causing the movable platform 11 to be moved with the first screw nut 122 toward the left end of the first screw rod 121. At this time, the second screw rod 131 is being moved toward the right end of the second screw nut 132 to shorten the distance between the second screw nut 132 and the second support 16, thereby reducing the stroke to compensate the problem that the movable platform 11 is stopped from movement by the second support 15.

It is to be noted that for enabling the first support 15 and the second support 16 to support the first screw rod 121 in the aforesaid operation in a better way, it is suggested to position the first support 15 in the middle position between the first screw nut 122 and the right end of the first screw rod 121 and the second support 16 in the middle position between the first screw nut 122 and the left end of the first screw rod 121. In this case, we can assure that the second speed V2 is lower than the first speed V1, and, the stroke in which the movable platform 11 is stopped from movement by the first support 15 or second support 16 can be minimized when the first speed V1 is twice the second speed V2.

Further, in this first embodiment, the driving mechanism 14 comprises a first transmission wheel 141, a second transmission wheel 142, a first driving wheel 143 driving mechanism 14, a second driving wheel 144, a drive motor 145, a first flexible member 146 and a second flexible member 147.

The first transmission wheel 141 is affixed to the first screw nut 122. The second transmission wheel 142 is affixed to the second screw nut 132. The first driving wheel 143 and the second driving wheel 144 are respectively affixed to the output shaft of the drive motor 145 and rotatable by the drive motor 145. The first flexible member 146 is hung on the first transmission wheel 141 and the first driving wheel 143 for enabling the first driving wheel 143 to rotate the first transmission wheel 141. The second flexible member 147 is hung on the second transmission wheel 142 and the second driving wheel 144 for enabling the second driving wheel 144 to rotate the second transmission wheel 142. According to this embodiment, the first transmission wheel 141, the second transmission wheel 142, the first driving wheel 143 and the second driving wheel 144 are belt pulleys. However, this is not a limitation. Alternatively, these wheels can be gearwheels. Further, the first flexible member 146 and the second flexible member 147 are endless belts. Alternatively, these flexible members can be gear chains to match with gearwheels. The drive motor 145 simultaneously drives the first driving wheel 143 and the second driving wheel 144, causing the first flexible member 146 and the second flexible member 147 to transfer the driving force to the first transmission wheel 141 and the second transmission wheel 142 in moving the first screw nut 122 and the second screw nut 132.

Figure 7:
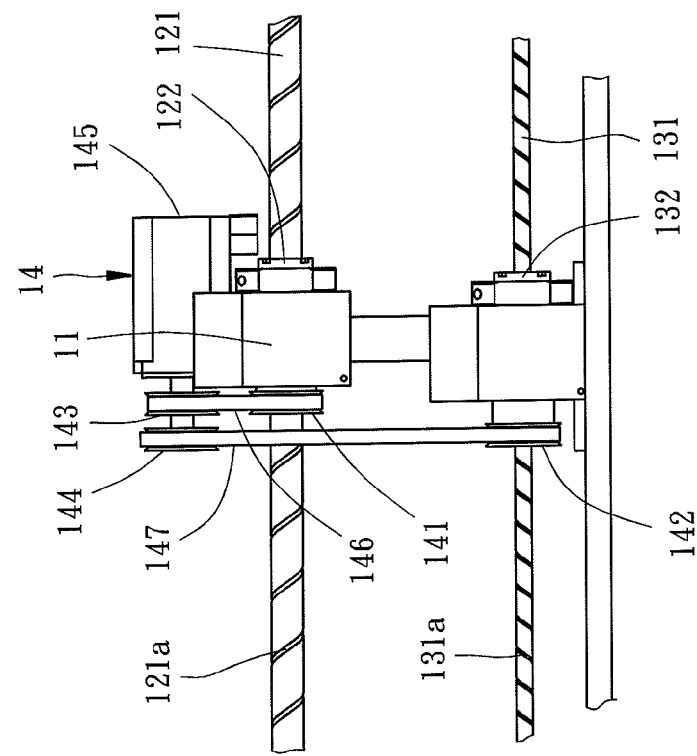
FIG. 7 is a partial view, in an enlarged scale, of a second embodiment of the present invention, illustrating the first thread groove and the second thread groove extended in reversed directions and the first guide stroke greater than the second guide stroke.

FIG. 7 illustrates a screw and nut assembly in accordance with a second embodiment of the present invention. This second embodiment is substantially similar to the aforesaid first embodiment with the exception of the features outlined hereinafter. The first transmission wheel 141 and the second transmission wheel 142 have the same outer diameter. The first driving wheel 143 and the second driving wheel 144 have the same outer diameter. The first screw rod 121 comprises a first thread groove 121a defining a first guide stroke. The second screw rod 131 comprises a second thread groove 131a defining a second guide stroke. The first thread groove 121a and the second thread groove 131a extend in revered directions. Further, the first guide stroke is greater than the second guide stroke. Similarly, for enabling the first support 15 and the second support 16 to support the first screw rod 121 in a better way, it is suggested to position the first support 15 in the middle position between the first screw nut 122 and the right end of the first screw rod 121 and the second support 16 in the middle position between the first screw nut 122 and the left end of the first screw rod 121, and to have the first guide stroke be twice the second guide stroke. Thus, the stroke in which the movable platform 11 is stopped from movement by the first support 15 or second support 16 can be minimized.

Figure 8:
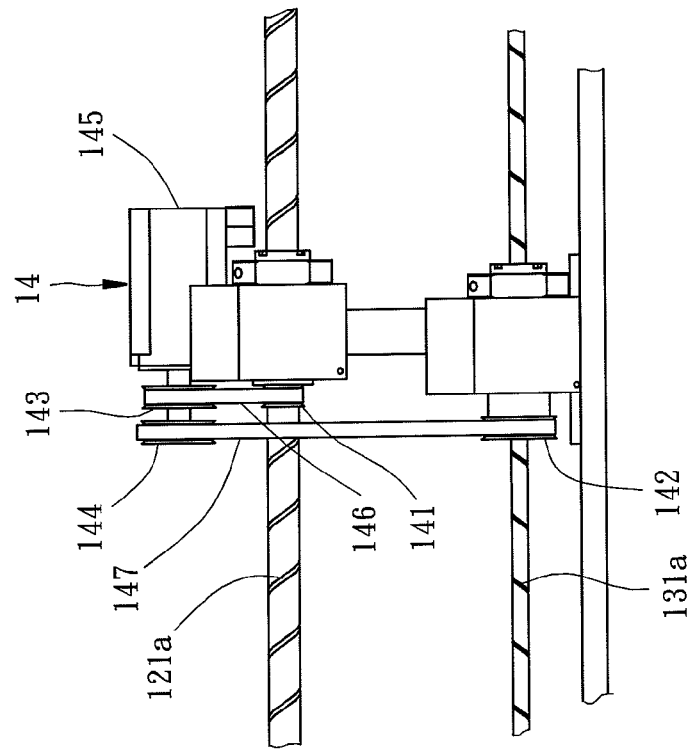
FIG. 8 is a partial view, in an enlarged scale, of a third embodiment of the present invention, illustrating the outer diameter of the first transmission wheel smaller than the outer diameter of the second transmission wheel.

FIG. 8 illustrates a screw and nut assembly in accordance with a third embodiment of the present invention. This third embodiment is substantially similar to the aforesaid first embodiment with the exception of the features outlined hereinafter. The first transmission wheel 141 has an outer diameter smaller than the outer diameter of the second transmission wheel 142. The first driving wheel 143 and the second driving wheel 144 have the same outer diameter. The first thread groove 121a and the second thread groove 131a extend in revered directions. Further, the first guide stroke is equal to the second guide stroke. Similarly, for enabling the first support 15 and the second support 16 to support the first screw rod 121 in a better way, it is suggested to position the first support 15 in the middle position between the first screw nut 122 and the right end of the first screw rod 121 and the second support 16 in the middle position between the first screw nut 122 and the left end of the first screw rod 121, and to have the outer diameter of the first transmission wheel 141 be one half of the outer diameter of the second transmission wheel 142. Thus, the stroke in which the movable platform 11 is stopped from movement by the first support 15 or second support 16 can be minimized.

Figure 9:
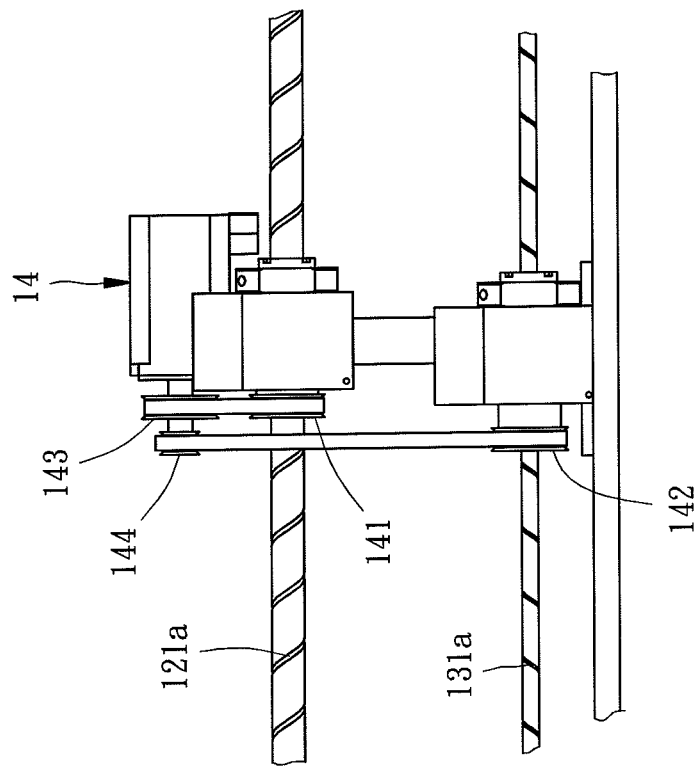
FIG. 9 is a partial view, in an enlarged scale, of a fourth embodiment of the present invention, illustrating the outer diameter of the first driving wheel smaller than the outer diameter of the second driving wheel.

FIG. 9 illustrates a screw and nut assembly in accordance with a fourth embodiment of the present invention. This fourth embodiment is substantially similar to the aforesaid first embodiment with the exception of the features outlined hereinafter. The first transmission wheel 141 and the second transmission wheel 142 have the same outer diameter. The first driving wheel 143 has an outer diameter greater than the outer diameter of the second driving wheel 144. The first thread groove 121a and the second thread groove 131a extend in revered directions. The first guide stroke is equal to the second guide stroke. Similarly, for enabling the first support 15 and the second support 16 to support the first screw rod 121 in a better way, it is suggested to position the first support 15 in the middle position between the first screw nut 122 and the right end of the first screw rod 121 and the second support 16 in the middle position between the first screw nut 122 and the left end of the first screw rod 121, and to have the outer diameter of the first driving wheel 143 be twice the outer diameter of the second driving wheel 144. Thus, the stroke in which the movable platform 11 is stopped from movement by the first support 15 or second support 16 can be minimized.

Figure 10:
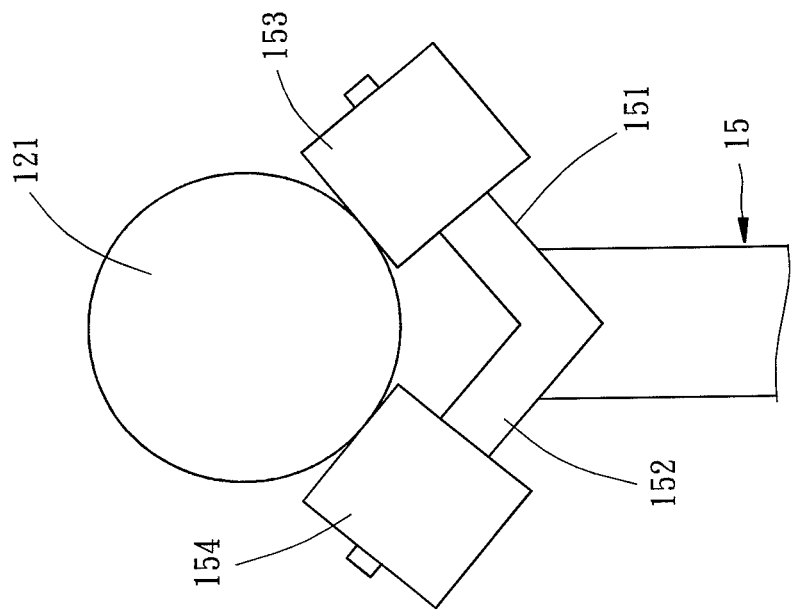
FIG. 10 is a partial view, in an enlarged scale, of the present invention, illustrating a first roller and a second roller respectively pivotally mounted at first and second wheel axles of the first support and kept in rolling contact with the first screw rod.

Further, as shown in FIG. 10, in order to reduce friction resistance during movement of the first support 15 relative to the first screw rod 121, the first support 15 is configured to provide a first wheel axle 151 and a second wheel axle 152 with a predetermined contained angle defined therebetween, and a first roller 153 and a second roller 154 are respectively pivotally mounted at the first wheel axle 151 and the second wheel axle 152 to support the first screw rod 121. Thus, during movement of the first support 15 relative to the first screw rod 121, the first roller 153 and the second roller 154 are in rolling contact with the first screw rod 121, reducing friction resistance. Further, it is to be noted that the arrangement of rollers to reduce friction resistance can also be employed to the second support 16.

Figure 11:
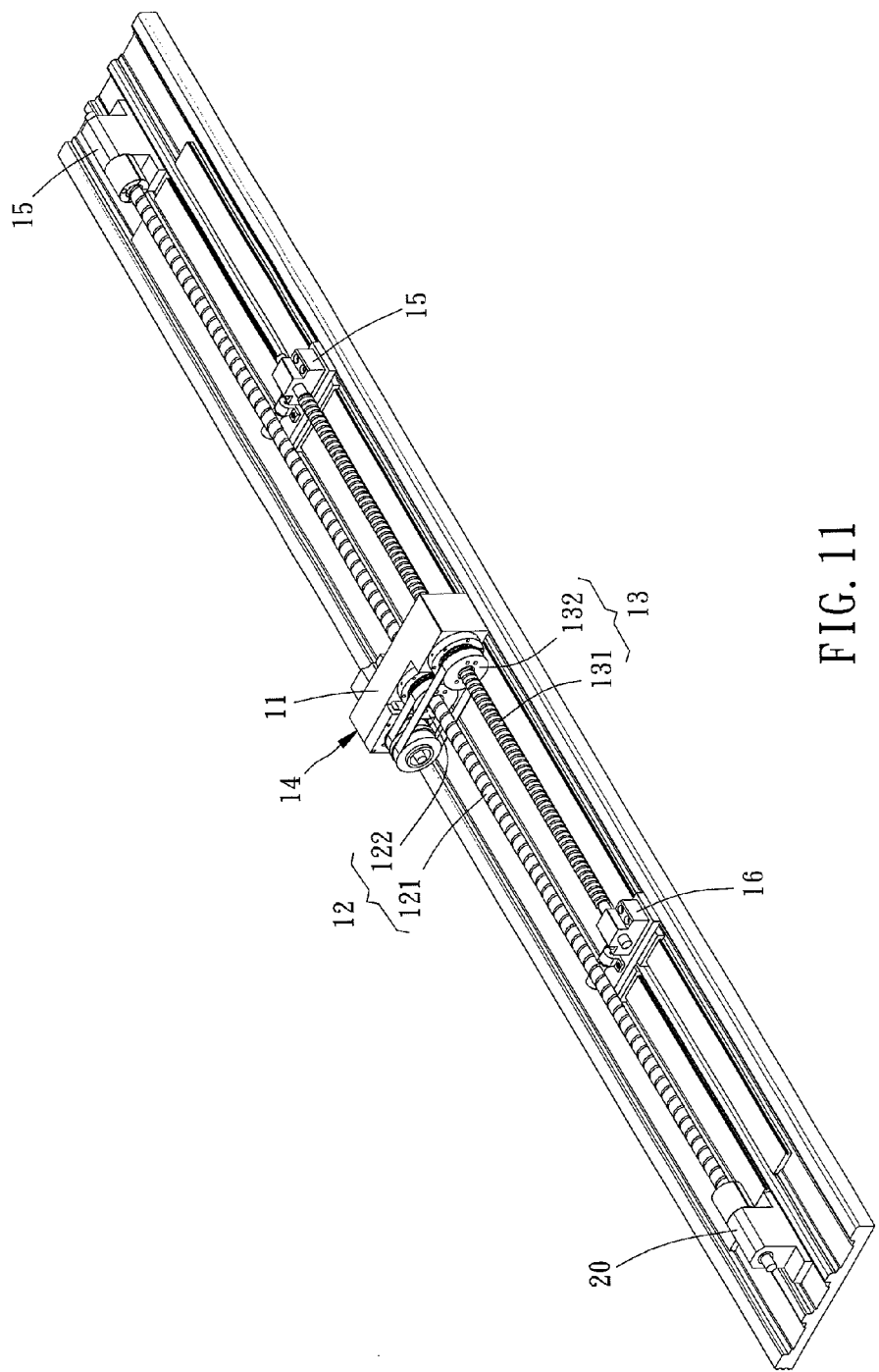
FIG. 11 is an oblique top elevation of a screw and nut assembly in accordance with a fifth embodiment of the present invention.
Figure 12:
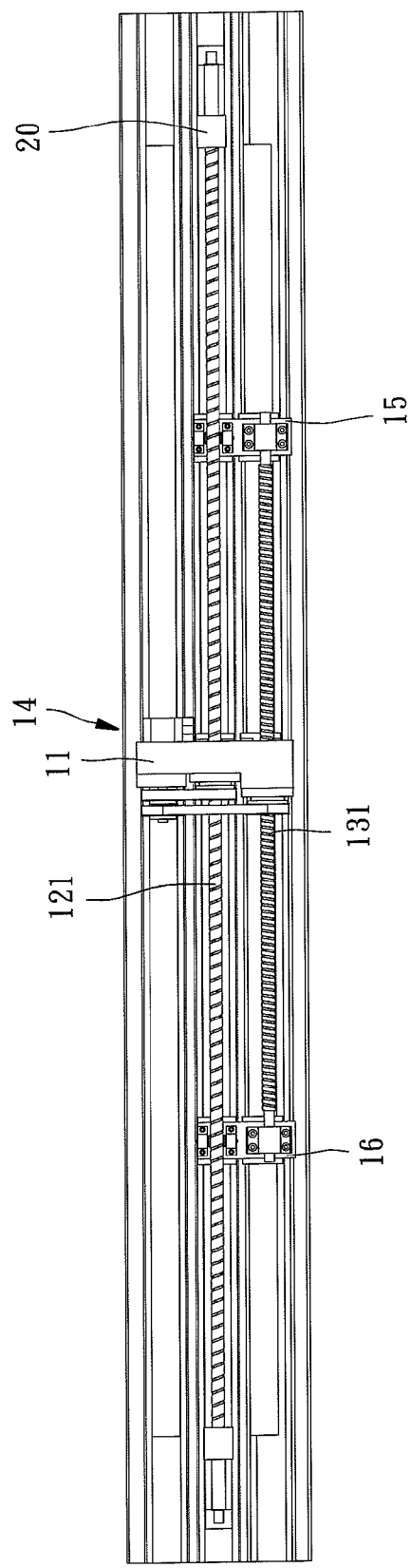
FIG. 12 is a top view of the screw and nut assembly in accordance with the fifth embodiment of the present invention.

FIGS. 11 and 12 illustrate a screw and nut assembly in accordance with a fifth embodiment of the present invention. This fifth embodiment is substantially similar to the aforesaid first embodiment with the exception of the features outlined hereinafter. In the aforesaid first embodiment, the first screw and nut set 12 and the second screw and nut set 13 are spaced one above the other. In this fifth embodiment, the first screw and nut set 12 and the second screw and nut set 13 are spaced horizontally. Therefore, the invention allows adjustment of the relative position between the first screw and nut set 12 and the second screw and nut set 13 subject to user's requirements.

In conclusion, the screw and nut assembly with screw rod support means provided by the present invention enables the stroke in which the movable platform 11 is stopped from movement during rotation of the first screw rod 121 to be minimized. Further, this structural design is much cheaper when compared to conventional pneumatic or hydraulic pressure-driven designs.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A screw and nut assembly, comprising:
a movable platform;
a first screw and nut set comprising a first screw rod and a first screw nut, said first screw rod having two opposite ends thereof respectively affixed to a respective locating member, said first screw nut being pivotally mounted in said movable platform and threaded onto said first screw rod and movable along said first screw rod;
a second screw and nut set comprising a second screw rod and a second screw nut, said second screw nut being pivotally mounted in said movable platform in such a manner that said second screw rod is threadable into said second screw nut and movable relative to said second screw nut;
a driving mechanism adapted to drive said first screw nut and said second screw nut simultaneously for causing said first screw nut to create a first speed relative to said first screw rod and said second screw rod to create a second speed relative to said second screw nut, said first speed being greater than said second speed, the direction of said first speed being reversed to the direction of said second speed; and
a first support and a second support respectively affixed to said second screw rod to support said first screw rod and to move with said second screw rod.

2. The screw and nut assembly as claimed in claim 1, wherein said first speed is twice said second speed.

3. The screw and nut assembly as claimed in claim 1, wherein said driving mechanism comprises a first transmission wheel affixed to said first screw nut, a second transmission wheel affixed to said second screw nut, a drive motor having an output shaft, a first driving wheel affixed to said output shaft of said drive motor and rotatable by said drive motor, a second driving wheel affixed to said output shaft of said drive motor and rotatable by said drive motor, a first flexible member hung on said first transmission wheel and said first driving wheel for enabling said first transmission wheel to be rotated by said first driving wheel, and a second flexible member hung on said second transmission wheel and said second driving wheel for enabling said second transmission wheel to be rotated by said second driving wheel.

4. The screw and nut assembly as claimed in claim 3, wherein said first transmission wheel and said second transmission wheel have a same outer diameter; said first driving wheel and said second driving wheel have a same outer diameter; said first screw rod comprises a first thread groove defining a first guide stroke; said second screw rod comprises a second thread groove defining a second guide stroke; said first thread groove and said second thread groove extend in reversed directions; said first guide stroke is greater than said second guide stroke.

5. The screw and nut assembly as claimed in claim 4, wherein said first guide stroke is twice said second guide stroke.

6. The screw and nut assembly as claimed in claim 3, wherein said first transmission wheel has an outer diameter smaller than said second transmission wheel; said first driving wheel and said second driving wheel have a same outer diameter; said first screw rod comprises a first thread groove, defining a first guide stroke; said second screw rod comprises a second thread groove, defining a second guide stroke; said first thread groove and said second thread groove extend in reversed directions; said first guide stroke is equal to said second guide stroke.

7. The screw and nut assembly as claimed in claim 6, wherein said first transmission wheel has an outer diameter about one half of the outer diameter of said second transmission wheel.

8. The screw and nut assembly as claimed in claim 3, wherein said first transmission wheel and said second transmission wheel have a same outer diameter; said first driving wheel has an outer diameter greater than the outer diameter of said second driving wheel; said first screw rod comprises a first thread groove, defining a first guide stroke; said second screw rod comprises a second thread groove, defining a second guide stroke; said first thread groove and said second thread groove extend in reversed directions; said first guide stroke is equal to said second guide stroke.

9. The screw and nut assembly as claimed in claim 8, wherein the outer diameter of said first driving wheel is twice the outer diameter of said second driving wheel.

10. The screw and nut assembly as claimed in claim 1, wherein said first support comprises a first wheel axle and a second wheel axle, said first wheel axle and said second wheel axle defining therebetween a predetermined contained angle, and a first roller and a second roller respectively pivotally mounted at said first wheel axle and said second wheel axle to support said first screw rod.

* * * * *